(12) United States Patent
Kume et al.

(10) Patent No.: US 10,451,133 B2
(45) Date of Patent: Oct. 22, 2019

(54) TUBULAR VIBRATION-DAMPING DEVICE

(71) Applicant: TOYOTA JIDOSHA KABUSHIKI KAISHA, Toyota-shi, Aichi-ken (JP)

(72) Inventors: Takashi Kume, Komaki (JP); Kazuyuki Matsuoka, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 15/837,033

(22) Filed: Dec. 11, 2017

(65) Prior Publication Data

US 2018/0172101 A1 Jun. 21, 2018

(30) Foreign Application Priority Data

Dec. 21, 2016 (JP) ................. 2016-248400

(51) Int. Cl.
*F16F 1/38* (2006.01)
*B60G 7/02* (2006.01)

(52) U.S. Cl.
CPC .............. *F16F 1/3863* (2013.01); *B60G 7/02* (2013.01); *F16F 1/38* (2013.01); *B60G 2204/143* (2013.01); *B60G 2204/41* (2013.01); *B60G 2204/45* (2013.01); *F16F 2226/04* (2013.01)

(58) Field of Classification Search
CPC .. F16F 1/38; F16F 1/3863; F16F 1/387; F16F 1/3876; F16F 1/3842; F16F 1/54; F16F 1/393; F16F 1/3814; F16F 1/3873; F16F 1/3935; F16F 2236/123; F16F 2228/08; B21J 9/025; B21K 21/12; B60G 3/20; B60G 7/005; B60G 21/0551; B60G 2200/18; B60G 2200/21; B60G 2204/14; B60G 2204/41; B60G 2204/1434; B60G 2204/41042
USPC .................. 267/141.2, 141.1, 141, 282, 292; 188/1.11 E; 29/888.06, 888.061
See application file for complete search history.

(56) References Cited

U.S. PATENT DOCUMENTS

| | | | | |
|---|---|---|---|---|
| 3,030,132 A | * | 4/1962 | Compton | ............ F16C 11/0614 403/203 |
| 3,140,081 A | * | 7/1964 | Peterson | ................. F16F 1/387 267/153 |
| 5,246,248 A | * | 9/1993 | Ferguson | ............. B60G 21/051 267/141.3 |

(Continued)

OTHER PUBLICATIONS

Communication dated Apr. 1, 2019 issued by the China National Intellectual Property Administration in counterpart Chinese application No. 201711235582.1.

*Primary Examiner* — Robert A. Siconolfi
*Assistant Examiner* — San M Aung
(74) *Attorney, Agent, or Firm* — Sughrue Mion, PLLC

(57) ABSTRACT

A tubular vibration-damping device including: an outer tube member; an inner shaft member inserted in the outer tube member; a main rubber elastic body elastically connecting the inner shaft member and the outer tube member to each other; tapered tube parts provided on axially opposite sides of the outer tube member, each of the tapered tube parts being constricted in diameter to have a shape that gradually contracts toward an axial outside; and an extended tube part extending from the axial outside of at least one of the tapered tube parts of the outer tube member, the extended tube part including an expansion part that expands radially outward toward the axial outside.

3 Claims, 2 Drawing Sheets

(56) References Cited

U.S. PATENT DOCUMENTS

| | | | | |
|---|---|---|---|---|
| 5,887,859 | A * | 3/1999 | Hadano | F16F 1/38 |
| | | | | 267/141.1 |
| 2002/0079629 | A1* | 6/2002 | Tadano | F16F 1/3863 |
| | | | | 267/140.11 |
| 2003/0020223 | A1* | 1/2003 | Kameda | B21J 9/025 |
| | | | | 267/293 |
| 2003/0218287 | A1* | 11/2003 | Mikami | B60G 21/0551 |
| | | | | 267/293 |
| 2005/0206054 | A1* | 9/2005 | Nishi | F16F 1/3814 |
| | | | | 267/140.5 |
| 2005/0258583 | A1* | 11/2005 | Schnaars | F16F 1/3863 |
| | | | | 267/293 |
| 2007/0039188 | A1* | 2/2007 | Meyerink | B21D 39/20 |
| | | | | 29/898.054 |
| 2007/0201945 | A1* | 8/2007 | Scharioth | B60G 7/001 |
| | | | | 403/132 |
| 2009/0289399 | A1* | 11/2009 | Suzuki | B60G 3/20 |
| | | | | 267/140.12 |
| 2011/0026862 | A1* | 2/2011 | Bjoerkgard | B60G 7/005 |
| | | | | 384/125 |
| 2012/0001398 | A1* | 1/2012 | Darcy-Sharma | B60G 7/006 |
| | | | | 280/124.125 |
| 2014/0091507 | A1* | 4/2014 | Oldfield | B60G 7/001 |
| | | | | 267/292 |
| 2015/0247543 | A1* | 9/2015 | Kuki | F16F 1/3842 |
| | | | | 267/141.2 |
| 2015/0273967 | A1* | 10/2015 | Grim | B60G 7/02 |
| | | | | 267/292 |

* cited by examiner

TUBULAR VIBRATION-DAMPING DEVICE

INCORPORATED BY REFERENCE

The disclosure of Japanese Patent Application No. 2016-248400 filed on Dec. 21, 2016 including the specification, drawings and abstract is incorporated herein by reference in its entirety.

BACKGROUND OF THE INVENTION

1. Field of the Invention

The present invention relates to a tubular vibration-damping device adapted for use as an automotive suspension bushing or the like.

2. Description of the Related Art

Conventionally, there is known a tubular vibration-damping device adapted for use as an automotive suspension bushing or the like. This tubular vibration-damping device, which is like a suspension bushing as disclosed in U.S. Pat. No. 5,887,859, has a structure in which an inner cylindrical member is inserted in an outer cylindrical member, and the inner cylindrical member and the outer cylindrical member are elastically connected by a vibration-damping rubber member.

Meanwhile, with the suspension bushing disclosed in U.S. Pat. No. 5,887,859, after vulcanization molding of the vibration-damping rubber member, the opposite end portions of the outer cylindrical member are constricted in diameter and processed to have tapered contours. By so doing, reduction in tensile stress of the vibration-damping rubber member, spring adjustment and the like are realized.

However, due to the tapered contours of the opposite end sides of the outer cylindrical member, the diameter of the ends of the outer cylindrical member is made small. Thus, during contact or the like of the inner cylindrical member and the outer cylindrical member at the time of large input, it may be difficult to ensure sufficient deformation rigidity of the outer cylindrical member.

SUMMARY OF THE INVENTION

It is therefore one object of this invention to provide a tubular vibration-damping device of novel structure which is able to obtain desired performance of the main rubber elastic body while setting an excellent load bearing capability to the outer tube member, as well as to avoid unnecessary contact of the inner shaft member and the outer tube member.

The above and/or optional objects of this invention may be attained according to at least one of the following modes of the invention. The following modes and/or elements employed in each mode of the invention may be adopted at any possible optional combinations.

Specifically, a first mode of the present invention provides a tubular vibration-damping device comprising: an outer tube member; an inner shaft member inserted in the outer tube member; a main rubber elastic body elastically connecting the inner shaft member and the outer tube member to each other; tapered tube parts provided on axially opposite sides of the outer tube member, each of the tapered tube parts being constricted in diameter to have a shape that gradually contracts toward an axial outside; and an extended tube part extending from the axial outside of at least one of the tapered tube parts of the outer tube member, the extended tube part including an expansion part that expands radially outward toward the axial outside.

With the tubular vibration-damping device of construction according to the above first mode, by providing the extended tube part on the axial outside of the tapered tube part and setting the expansion part to the extended tube part, it is possible to make the diameter of the axial end of the outer tube member large. By so doing, with respect to a larger moment input in the prizing direction, deformation of the outer tube member will be prevented, so as to increase substantial deformation rigidity of the outer tube member with respect to the moment input in the prizing direction. Thus, durability of the outer tube member may be improved.

Moreover, by providing the extended tube part to the axial outside of the tapered tube part, the distance from the center of prizing displacement of the inner shaft member and the outer tube member to the axial end of the outer tube member is made large. As a result, interference between the inner shaft member and the outer tube member due to the prizing displacement is likely to occur. However, since the extended tube part includes the expansion part that expands radially outward, the inner shaft member is less likely to come into contact with the extended tube part due to the prizing displacement. Therefore, contact of the inner shaft member and the outer tube member during the prizing displacement is prevented from exerting influence on vibration damping performance or the like, thereby realizing desired vibration damping characteristics.

A second mode of the present invention provides the tubular vibration-damping device according to the first mode, wherein the extended tube part of the outer tube member entirely comprises the expansion part.

According to the second mode, the extended tube part entirely has a shape that expands radially outward toward the axial outside. Thus, even if the extended tube part is relatively short in length, it is possible to make the diameter of the axially outer edge of the outer tube member on the extended tube part side sufficiently large. This makes it possible to obtain an excellent load bearing capability of the outer tube member in a compact design, as well as to effectively prevent interference between the inner shaft member and the outer tube member during input in the prizing direction.

A third mode of the present invention provides the tubular vibration-damping device according to the first or second mode, wherein the expansion part includes an end of the extended tube part on a side of the tapered tube part.

According to the third mode, the extended tube part expands radially outward immediately from the end on the side of the tapered tube part, thereby more effectively preventing interference between the inner shaft member and the outer tube member during prizing.

A fourth mode of the present invention provides the tubular vibration-damping device according to any one of the first through third modes, wherein the extended tube part is provided on only one axial side of the outer tube member, and an axial center of the inner shaft member and the outer tube member is set at an axial position different from a center of relative prizing displacement of the inner shaft member and the outer tube member.

There are some cases in which, for example, only the end of one axial side of the outer tube member is assumed to come into abutment with the inner shaft member side or the like. In such cases, as shown in the fourth mode, by providing the extended tube part on only the one axial side and setting the expansion part to the extended tube part, it is possible to enhance deformation rigidity of the outer tube member, to avoid interference with the inner shaft member during input in the prizing direction, and the like.

According to the present invention, the extended tube part extends from the axial outside of the tapered tube part of the outer tube member, and the extended tube part includes the expansion part that expands radially outward toward the axial outside. With this configuration, the axial end of the outer tube member constituted by the extended tube part has a large diameter, so that with respect to a larger moment input in the prizing direction, deformation of the outer tube member will be prevented. Thus, durability of the outer tube member may be improved. Besides, since the extended tube part includes the expansion part that expands radially outward, the inner shaft member is less likely to come into contact with the extended tube part due to prizing displacement. This makes it possible to avoid influence of the contact between the inner shaft member and the extended tube part on vibration damping characteristics.

BRIEF DESCRIPTION OF THE DRAWINGS

The foregoing and/or other objects, features and advantages of the invention will become more apparent from the following description of an embodiment with reference to the accompanying drawings in which like reference numerals designate like elements and wherein.

DETAILED DESCRIPTION OF EMBODIMENTS

An embodiment of the present invention will be described below in reference to the drawings.

Figure 1:
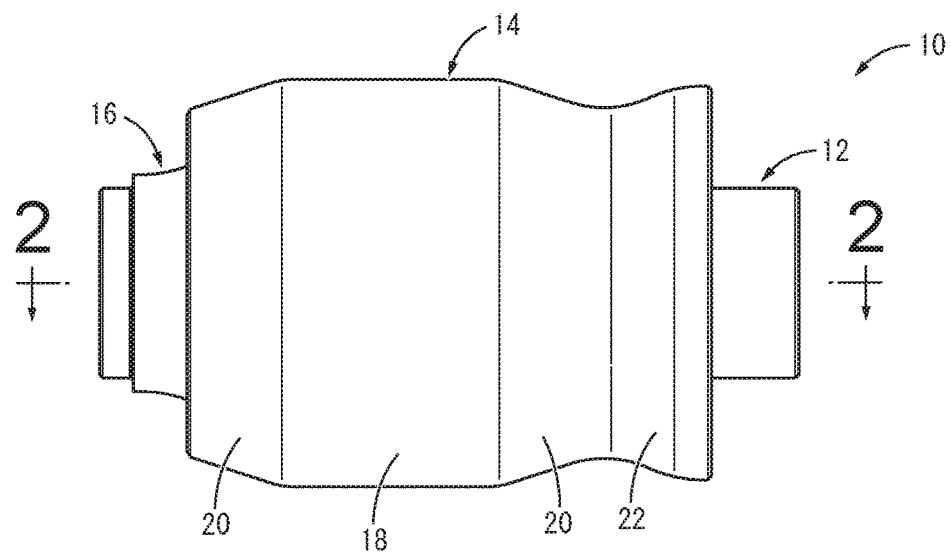
FIG. 1 is a front view showing a tubular vibration-damping device in the form of a suspension bushing as a first embodiment of the present invention.
Figure 2:
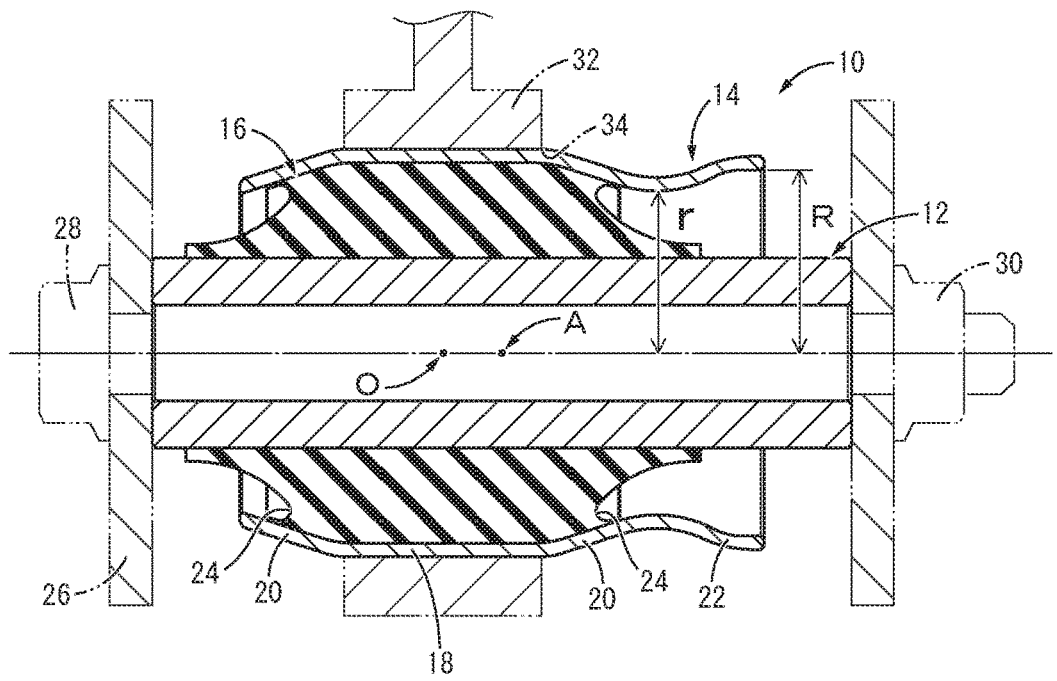
FIG. 2 is a cross sectional view taken along line 2-2 of FIG. 1.

FIGS. 1 and 2 depict an automotive suspension bushing 10 as a first embodiment of the tubular vibration-damping device constructed according to the present invention. The suspension bushing 10 has a structure in which an inner shaft member 12 is inserted in an outer tube member 14, and the inner shaft member 12 and the outer tube member 14 are elastically connected to each other by a main rubber elastic body 16.

Described more specifically, the inner shaft member 12 is a rigid component made of metal or the like, and has a thick, small-diameter, generally round tubular shape.

The outer tube member 14 is a rigid component made of metal or the like, and has a thin, large-diameter, generally round tubular shape including a mounting tubular part 18 that extends straightly in the axial direction with a generally unchanging cross section. Besides, on axially opposite sides of the mounting tubular part 18 of the outer tube member 14, integrally formed are tapered tube parts 20 that gradually become smaller in diameter toward the axial outside. The tapered tube parts 20 are tapered by performing a diameter reduction process such as 360-degree radial compression on the outer tube member 14 after vulcanization molding of the main rubber elastic body 16 described later. In the present embodiment, the tapered tube part 20 slopes with respect to the axial direction in a generally constant slope angle in its entirety. However, the slope angle of the tapered tube part 20 with respect to the axial direction may become larger progressively or in a stepwise manner toward the axial outside, for example.

Moreover, on the axial outside of one tapered tube part 20, an extended tube part 22 is integrally formed. The extended tube part 22 has tapered contours whose diameter gradually becomes larger toward the axial outside. In the present embodiment, the extended tube part 22 including the end on the side of the tapered tube part 20 entirely comprises an expansion part that expands radially outward toward the axial outside. Besides, the extended tube part 22 of the present embodiment has a cross sectional shape that curves in a smoothly continuous fashion from the tapered tube part 20 to the axial distal end. Thus, the outer circumferential surface and the inner circumferential surface of the extended tube part 22 comprise a curving surface without any break point or broken line. Furthermore, regarding the extended tube part 22, the slope angle with respect to the axial direction continuously changes, and in the present embodiment, the slope angle at the axially medial portion is greater than the slope angles at axially opposite end portions. By the extended tube part 22 having the tapered contours that expand in this way, in comparison with the axial outer edge of the tapered tube part 20 whose diameter is made small, the axial outer edge of the extended tube part 22 has a larger diameter. In the present embodiment, the diameter of the axial outer edge of the extended tube part 22 is made roughly equal to that of the mounting tubular part 18.

No particular limitation is imposed as to the method of molding the extended tube part 22 of tapered contours including the expansion part. For example, a metal tubing of round tubular shape extending with a constant diameter is prepared, and a diameter reduction process is performed on the formation zone of the tapered tube part 20. Accordingly, the end of the extended tube part 22 on the side of the tapered tube part 20 is also constricted in diameter, so that the extended tube part 22 is made to have a shape that expands toward the axial outside. This makes it possible to simultaneously form the tapered tube part 20 whose diameter becomes smaller toward the axial outside and the extended tube part 22 of tapered contours. Besides, during forming of the tapered tube part 20 by means of a diameter reduction process, by overlapping a die (not shown) with the inner circumferential surface of the extended tube part 22, the extended tube part 22 of desired shape can also be obtained with a higher degree of accuracy. In addition, as a separate step from the diameter-constriction forming of the tapered tube part 20, it is also possible to provide a step for processing the extended tube part 22 into the prescribed expanded, tapered contours by sheet metal pressing or the like.

Then, as shown in FIG. 2, the inner shaft member 12 is inserted into the outer tube member 14, and the inner shaft member 12 and the outer tube member 14 are elastically connected by the main rubber elastic body 16. The axial dimension of the inner shaft member 12 is made greater than the axial dimension of the outer tube member 14 including the extended tube part 22. Thus, the axially opposite end parts of the inner shaft member 12 inserted in the outer tube member 14 project from the openings of the outer tube member 14 on axially opposite sides with roughly the same length as each other.

The main rubber elastic body 16 has a thick, generally round tubular shape, and its inner circumferential surface is bonded by vulcanization to the outer peripheral surface of the inner shaft member 12, while its outer circumferential surface is bonded by vulcanization to the outer tube member 14. Moreover, the inner circumferential end of the main rubber elastic body 16 projects further to the axially opposite sides than the outer circumferential end thereof does, so that the bonding area to the small-diameter inner shaft member 12 is largely obtained. Besides, at the axial ends of the main rubber elastic body 16, annular void portions 24 are respectively provided so as to open onto the axial end faces of the main rubber elastic body 16.

The main rubber elastic body 16 is bonded by vulcanization to the outer tube member 14 before the formation of the tapered tube parts 20. After the vulcanization molding of the main rubber elastic body 16, the outer tube member 14 is subjected to the diameter reduction process so as to have the tapered tube parts 20. This may achieve reduction in tensile stress of the main rubber elastic body 16 due to cooling contraction after the molding, adjustment of spring characteristics of the main rubber elastic body 16, and the like. In particular, the outer tube member 14 may be constricted in diameter to be processed into the tapered contours at the axially opposite end parts of the portion to which the main rubber elastic body 16 is bonded. By so doing, for example, it is possible to set a hard spring in the axial direction or in the axis-perpendicular direction by limiting the amount of swelling deformation of the main rubber elastic body 16 to the axial outside or the like, while setting a soft spring in the prizing direction owing to the shear spring component. It would also be acceptable to constrict the mounting tubular part 18 in diameter simultaneously with or separately from the formation of the tapered tube parts 20 by means of the diameter reduction process. This makes it possible to more advantageously achieve the reduction in tensile stress of the main rubber elastic body 16, the hard spring characteristics in the axis-perpendicular direction, and the like.

As hypothetically shown in FIG. 2, the suspension bushing 10 of the above construction is configured to be used in a state of being mounted onto a vehicle. Specifically, as indicated by the chain double-dashed line in FIG. 2, an attachment piece 26 of a vehicle body is disposed so as to clasp the inner shaft member 12 from the axially opposite sides, and by means of a bolt 28 that perforates the inner shaft member 12 and the attachment piece 26, and a nut 30 to be threaded onto the bolt 28, the inner shaft member 12 and the attachment piece 26 are configured to be fixed. Meanwhile, regarding the outer tube member 14, the mounting tubular part 18 is configured to be secured by being press-fitted into a mounting hole 34 of a suspension arm 32. In this way, by the inner shaft member 12 being attached to the vehicle body side while the outer tube member 14 being attached to the suspension arm 32 side, the suspension bushing 10 is mounted onto the vehicle so that the suspension arm 32 is linked in a vibration damped manner to the vehicle body.

With the suspension bushing 10 mounted onto the vehicle, when vibration is input, the main rubber elastic body 16 undergoes elastic deformation due to relative displacement of the inner shaft member 12 and the outer tube member 14. By so doing, the suspension bushing 10 exhibits vibration damping effects such as vibration attenuating action and vibration insulating action.

Figure 3:
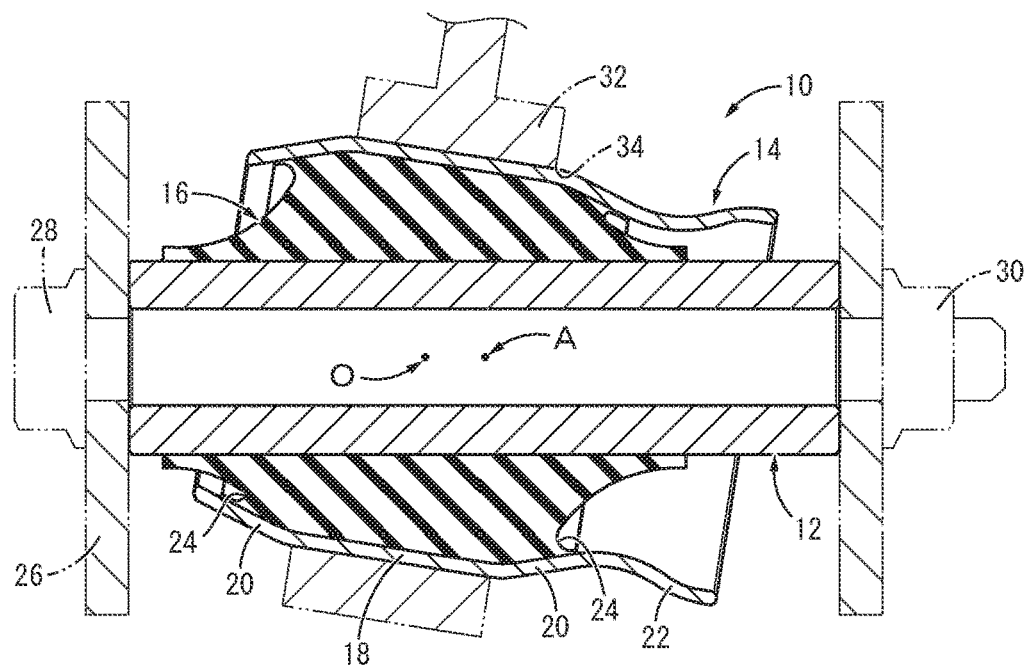
FIG. 3 is a cross sectional view showing the suspension bushing of FIG. 1 affected by an external force in the prizing direction.

In the suspension bushing 10, the center of relative prizing displacement of the inner shaft member 12 and the outer tube member 14 is the point O in FIG. 2, which is the elastic center of the main rubber elastic body 16. Thus, the center of relative prizing displacement of the inner shaft member 12 and the outer tube member 14 is set at the axial position different from the point A, which is the axial center of the inner shaft member 12 and the outer tube member 14 on the center axis. With this arrangement, on one axial end (the right side in FIG. 2) for which the distance from the point O is made long with the extended tube part 22 provided, the amount of relative displacement between the inner shaft member 12 and the outer tube member 14 in the axis-perpendicular direction with respect to input in the prizing direction is greater than that on the other axial end. Here, with the suspension bushing 10, as shown in FIG. 3, when the inner shaft member 12 and the outer tube member 14 tilt relative to each other due to vibration input in the prizing direction, the extended tube part 22 of the outer tube member 14 is configured not to come into contact with the inner shaft member 12.

More specifically, the extended tube part 22, for which its contact with the inner shaft member 12 can be a problem during input in the prizing direction, has a sloping shape that progressively expands toward the axial outside. Therefore, even if the inner shaft member 12 and the outer tube member 14 tilt relative to each other as shown in FIG. 3, the inner shaft member 12 is less likely to come into contact with the extended tube part 22. In the present embodiment, the shape of the extended tube part 22 is set such that the inner shaft member 12 and the extended tube part 22 of the outer tube member 14 will not come into contact with each other during conceivable, normal input in the prizing direction.

Figure 4:
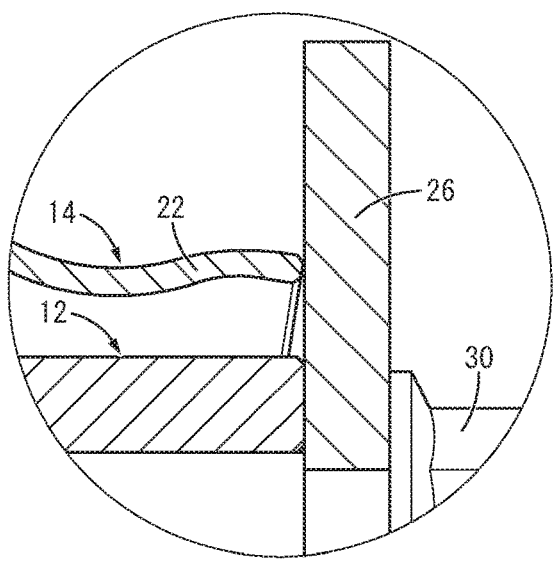
FIG. 4 is an enlarged partial view in cross section showing an abutting part between an extended tube part of an outer tube member and an attachment piece of a vehicle body with the suspension bushing of FIG. 1 mounted onto a vehicle.

Besides, there are some cases in which vibration in the axial direction and vibration in the prizing direction are combinedly input or the like, and the amount of relative displacement between the inner shaft member 12 and the outer tube member 14 becomes large. In such a case, as shown in FIG. 4, the axial end of the extended tube part 22 of the outer tube member 14 is configured to come into abutment with the attachment piece 26 of the vehicle body, thereby limiting the amount of relative displacement between the inner shaft member 12 and the outer tube member 14. Such a stopper provided by the abutment between the extended tube part 22 and the attachment piece 26 may prevent excessive deformation of the main rubber elastic body 16, thereby improving durability of the main rubber elastic body 16.

The extended tube part 22 providing such a stopper has tapered contours that expand toward the axial outside, thereby being endowed with excellent durability with respect to a stopper load.

Specifically, since the extended tube part 22 has a shape that expands toward the axial outside, as shown in FIG. 2, the radius R at the axially outer edge of the extended tube part 22 is greater than the radius r at the axially outer edge of the tapered tube part 20. With this configuration, in comparison with the case of providing the extended tube part whose radius is equal to that of the axially outer edge of the tapered tube part 20, the distance from the action center O of moment in the prizing direction is greater, thereby decreasing the load acting on the outer tube member 14 due to the moment in the prizing direction. As a result, the deformation of the outer tube member 14 is prevented with respect to a larger moment in the prizing direction, so as to be able to attain the effect similar to the improvement in the durability obtained by increasing the deformation rigidity of the outer tube member 14. It should be appreciated that the radius R at the axially outer edge of the extended tube part 22 is preferably made equal to or not greater than the radius of the mounting tubular part 18. By so doing, ease of molding, avoidance of interference with other components, securing of strength and the like can be expected.

Moreover, since the extended tube part 22 of the outer tube member 14 has a shape that expands toward the axial outside, when the extended tube part 22 and the attachment piece 26 of the vehicle body come into abutment with each other due to input in the prizing direction, the relative slope angle created by the direction of abutment between the extended tube part 22 and the attachment piece 26 and the direction of extension of the extended tube part 22 is small. With this configuration, the extended tube part 22 is less likely to undergo bending deformation to the thickness direction due to the action of the stopper load, thereby being able to receive a larger stopper load. In the present embodiment in particular, at the axially outer edge of the extended tube part 22, there is provided an edge part whose taper angle is made extremely small while extending with a generally constant radius. This may enhance deformation rigidity at the edge part for which a degree of freedom of deformation is high.

In this way, by providing the extended tube part 22 of tapered contours at the axial end of the outer tube member 14, it is possible to constitute the stopper comprising the extended tube part 22 with respect to inputs in the axial direction and in the prizing direction. Besides, durability and spring characteristics of the main rubber elastic body 16 can be achieved by forming the tapered tube part 20 through diameter constriction while avoiding interference between the inner shaft member 12 and the extended tube part 22.

Additionally, since the extended tube part 22 of the outer tube member 14 entirely has tapered contours, it is possible to set a large inside diameter dimension to the extended tube part 22 with a relatively short length dimension in the axial direction. This makes it possible to more effectively avoid interference between the inner shaft member 12 and the outer tube member 14, while obtaining excellent load bearing capability and the like as well. Moreover, the extended tube part 22 of the present embodiment has curving contours whose slope angle continuously changes. Thus, stress concentration can be avoided during action of the stopper load, thereby achieving better durability.

Furthermore, the extended tube part 22 of the outer tube member 14 has tapered contours at its axially inner edge that connects with the tapered tube part 20. Accordingly, the inside diameter dimension of the extended tube part 22 can be largely obtained at the axially inside portion as well, thereby more effectively preventing contact between the inner shaft member 12 and the extended tube part 22 due to input in the prizing direction.

Owing to the extended tube part 22 provided to the outer tube member 14, even if the main rubber elastic body 16 breaks, the amount of displacement of the outer tube member 14 in the axial direction may be limited by abutment between the outer tube member 14 and the attachment piece 26 of the vehicle body. Specifically, with the suspension bushing 10 of the present embodiment, the inner shaft member 12 projects largely to one axial side in an unbalanced manner with respect to the main rubber elastic body 16. Accordingly, the axial distance between the tapered tube part 20 and the attachment piece 26 on the one axial side of the outer tube member 14 is greater than the axial distance between the tapered tube part 20 and the attachment piece 26 on the other axial side thereof. Here, since the extended tube part 22 is provided to the one axial end of the outer tube member 14, the axial distances between the outer tube member 14 and the attachment piece 26 are roughly equal on the axially opposite sides. With this arrangement, if the main rubber elastic body 16 breaks, the permitted amount of displacement of the outer tube member 14 in the axial direction may be approximately the same on the axially opposite sides. This makes it possible to prevent interference with other components due to a large displacement of the outer tube member 14 and the suspension arm 32 and the like. That is, in the suspension bushing 10 of the present embodiment, the extended tube part 22 of the outer tube member 14 not only constitutes the stopper with respect to input in the prizing direction but also constitutes the stopper for limiting the amount of relative displacement between the inner shaft member 12 and the outer tube member 14 in the axial direction.

An embodiment of the present invention has been described in detail above, but the present invention is not limited to those specific descriptions. For example, whereas the preceding embodiment exemplified the outer tube member 14 having the structure in which the extended tube part 22 is provided only on one axial side, the extended tube part 22 can also be provided on the axially opposite sides, for example. In the case in which the extended tube part 22 is provided on the axially opposite sides in this way, the respective extended tube parts 22, 22 on the axially opposite sides may have mutually the same structure, or may have mutually different structures.

Besides, it is not necessary that the extended tube part 22 entirely comprise the expansion part, but it would also be possible that the expansion part is provided to the extended tube part 22 partially in the axial direction. Namely, the expansion part may be provided to axially either one end of the extended tube part 22, or may be provided to the axially medial portion thereof. Moreover, the expansion part of the extended tube part 22 may smoothly curve with the slope angle progressively changing as shown in the preceding embodiment, or may alternatively have the slope angle that is roughly constant.

Additionally, for example, it would also be acceptable for the inner shaft member 12 to be provided with a protruding part integrally or as a separate component so as to be partially large in diameter at the axially medial portion to which the main rubber elastic body 16 is bonded. This makes it possible to realize both the hard spring in the axis-perpendicular direction and the soft spring in the prizing direction.

Furthermore, whereas the preceding embodiment described a so-called solid-type tubular vibration-damping device, the present invention can also be applied to a fluid-filled tubular vibration-damping device that utilizes vibration damping effect based on flow action of the non-compressible fluid or liquid sealed inside, for example.

The present invention is not limited to implementation in suspension bushings only, and is adaptable to implementation in tubular vibration-damping devices used as engine mounts, sub-frame mounts, differential mounts, or the like. Moreover, the application range of the present invention is not limited to tubular vibration-damping devices for automotive use, but the present invention can preferably be adopted by tubular vibration-damping devices for use in motorcycles, rail vehicles, industrial vehicles, and the like.

What is claimed is:

1. A tubular vibration-damping device comprising:
    an outer tube member;
    an inner shaft member inserted in the outer tube member;
    a main rubber elastic body elastically connecting the inner shaft member and the outer tube member to each other;
    tapered tube parts provided on axially opposite sides of the outer tube member, each of the tapered tube parts being constricted in diameter to have a shape that gradually contracts toward an axial outside; and an extended tube part extending from the axial outside of at least one of the tapered tube parts of the outer tube member, the extended tube part including an expansion part that expands radially outward toward the axial outside, wherein the extended tube part is provided on only one axial side of the outer tube member, and an axial center of the inner shaft member and the outer tube member is set at an axial position different from a center of relative prizing displacement of the inner shaft member and the outer tube member.

2. The tubular vibration-damping device according to claim 1, wherein the extended tube part of the outer tube member entirely comprises the expansion part.

3. The tubular vibration-damping device according to claim 1, wherein the expansion part includes an end of the extended tube part on a side of the tapered tube part.

* * * * *